No. 764,623. PATENTED JULY 12, 1904.
N. F. PALMER.
MACHINE FOR MOLDING ARTIFICIAL STONE.
APPLICATION FILED JAN. 21, 1904.
NO MODEL.
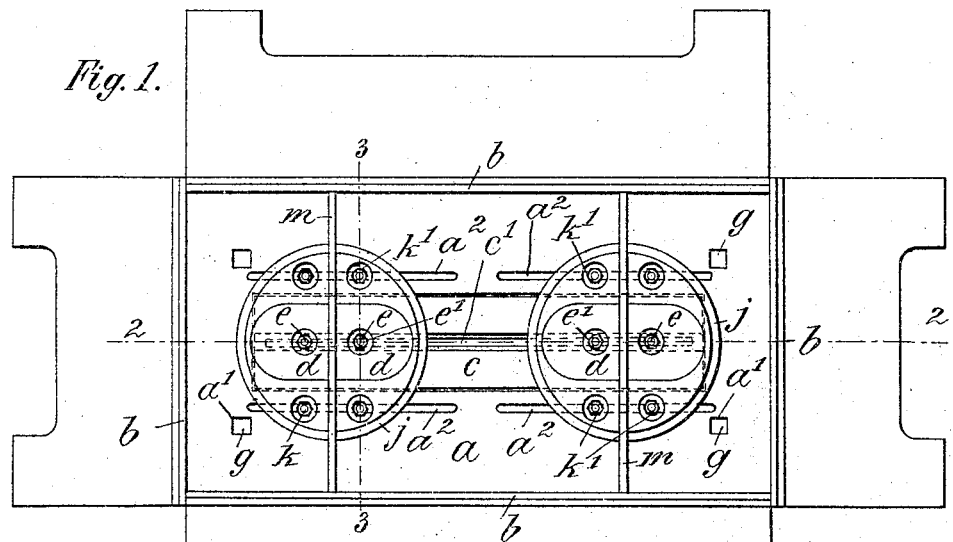
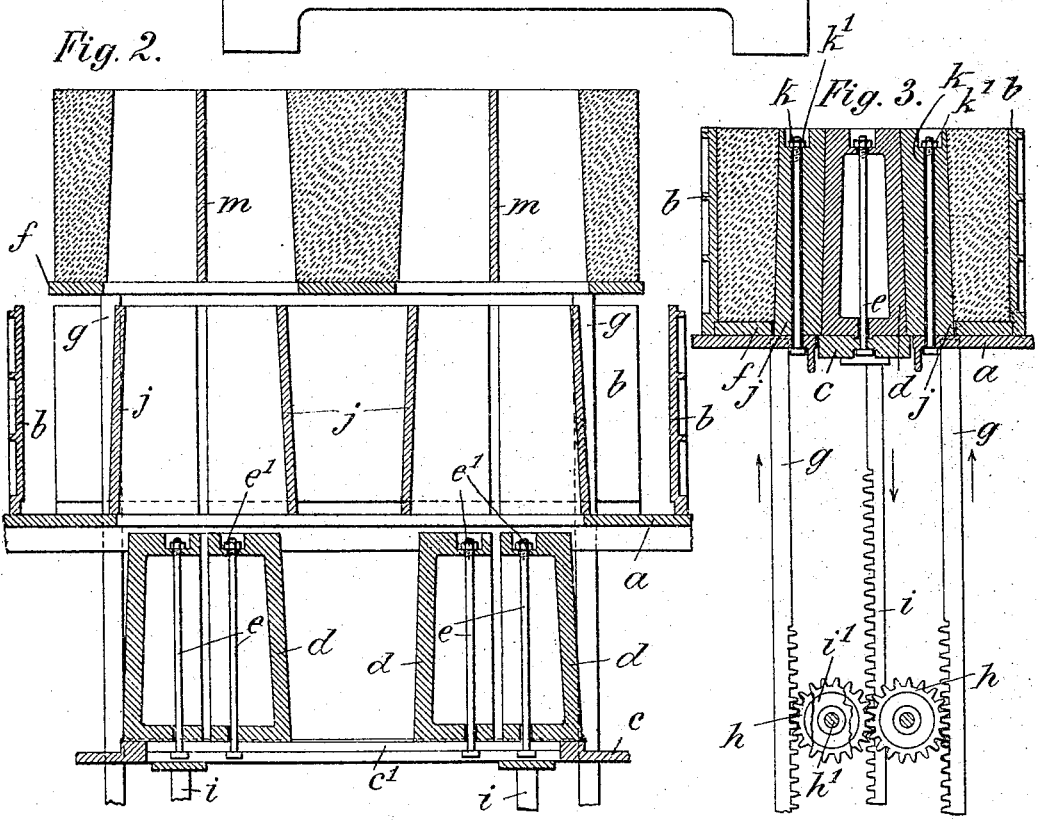

No. 764,623. Patented July 12, 1904.

UNITED STATES PATENT OFFICE.

NOYES F. PALMER, OF NEW YORK, N. Y.

MACHINE FOR MOLDING ARTIFICIAL STONE.

SPECIFICATION forming part of Letters Patent No. 764,623, dated July 12, 1904.

Application filed January 21, 1904. Serial No. 189,956. (No model.)

*To all whom it may concern:*

Be it known that I, NOYES F. PALMER, a citizen of the United States, residing at New York city, Brooklyn, county of Kings, and State of New York, have invented new and useful Improvements in Machines for Molding Artificial Stone, of which the following is a specification.

This invention relates to an improved machine for molding artificial stone, the machine being so constructed that the weight of the product may be readily changed.

In the accompanying drawings, Figure 1 is a plan of my improved machine for molding artificial stone with the platen removed; Fig. 2, a vertical longitudinal section thereof, showing the molded stone raised; and Fig. 3, a cross-section on line 3 3, Fig. 1.

The letter $a$ represents the base-plate, and $b$ represents the sides of a mold that may be opened or closed in suitable manner. The base-plate $a$ has a central opening for accommodating a vertically-movable core-plate $c$, upon which a suitable number of tapering cores $d$, having closed tops, are adjustably mounted. In order to secure the cores adjustably upon the plate $c$, the latter is provided with a longitudinal slot $c'$, adapted for the reception of bolts $e$. These bolts extend through upright perforations of the cores and carry countersunk nuts $e'$. By loosening the nuts and shifting the bolts within the slot $c'$ the position of the cores may be readily changed.

Within the mold there is placed a false bottom or platen $f$, which is adapted to lift the green block out of the mold. This platen may be moved in a direction opposite to that of the core-plate $c$ by any suitable mechanism. The drawings show the platen to be engaged by toothed lifters $g$, passing through openings $a'$ of base-plate $a$ and driven by gear-wheels $h$. Upon the axle $h'$ of one of the wheels $h$ is mounted a second gear-wheel $i''$, engaging a rack $i$, which is attached to core-plate $c$.

By the machine as thus far described a block having an opening corresponding to the size of the core $d$ may be molded. It is, however, frequently desired to increase the hollow of the block in order to adapt the block to lighter work. In order to set the machine to mold such lighter blocks without removing the cores $d$, I have devised the following construction: Concentrically to each core $d$ I fit upon the base-plate $a$ a hollow tubular tapering shell $j$, which is open at the top and bottom. The bore of the shell conforms to the contour of the core, the drawings, Fig. 1, showing the core and the shell to be of oval form in cross-section. The circumference of the shell is, however, eccentric to its bore, it being shown to be circular. In this way the side of the shell gradually increases in thickness from two diametrically opposite points toward the two intermediate opposite points. The thickened sections of the shell are provided with upright perforations adapted for the accommodation of bolts $k$, carrying countersunk nuts $k'$. The bolts $k$ engage parallel longitudinal slots $a^2$ of base-plate $a$, and thus by loosening the nuts the position of the shell-sections may be adjusted to conform to the position of the cores $d$. If it is desired to subdivide the molded block by means of interior partitions $m$, each shell $j$ is made of two detached semitubular sections which are slightly separated from each other in order to accommodate the partitions.

If it is desired to mold a block with a small opening, the shells $j$ are removed. If, however, larger openings are desired, the shells $j$ are bolted to the bed-plate $a$, concentric to the cores. The machine is then operated in the usual manner, the cores $d$ in rising entering the shells, so as not to interfere with the molding of the block. In fitting the shells to the bed-plate the cores are first raised to constitute centering devices for the shells. Thus the configuration of the block will be maintained, while its openings will be enlarged. The top of the cores when raised, as well as the top of the shells, must be flush with the top of the mold. Hence the shells must be open on top to accommodate the cores. When the shells are in position, the cores being closed on top will close the shells and prevent the surplus from dropping into the shells while the block is being struck off.

What I claim is—

In a machine for making artificial stone, the combination of a mold having a perforated base-plate, with a tapering open shell mounted thereon, a vertically-movable core-plate, and a closed tapering core mounted upon said plate, and adapted to be projected through the perforated base-plate into said shell, substantially as described.

Signed by me at New York city, Manhattan, New York, this 20th day of January, 1904.

NOYES F. PALMER.

Witnesses:
WILLIAM SCHULZ,
FRANK V. BRIESEN.